(12) United States Patent
Mouton

(10) Patent No.: US 10,679,524 B1
(45) Date of Patent: Jun. 9, 2020

(54) MOTORCYCLE ENGINE ADORNMENT

(71) Applicant: Guy Mouton, Woodstock, IL (US)

(72) Inventor: Guy Mouton, Woodstock, IL (US)

(*) Notice: Subject to any disclaimer, the term of this patent is extended or adjusted under 35 U.S.C. 154(b) by 0 days.

(21) Appl. No.: 16/100,363

(22) Filed: Aug. 10, 2018

Related U.S. Application Data

(60) Provisional application No. 62/543,736, filed on Aug. 10, 2017.

(51) Int. Cl.
*G09F 7/18* (2006.01)
*B62J 99/00* (2020.01)
*B60R 13/00* (2006.01)

(52) U.S. Cl.
CPC ............ *G09F 7/18* (2013.01); *B62J 99/00* (2013.01); *B60R 13/005* (2013.01); *B62J 2099/0086* (2013.01); *G09F 2007/1865* (2013.01)

(58) Field of Classification Search
CPC ....... B62J 2099/0086; B62J 2099/0033; B60R 13/005; B60R 13/04; G09F 7/18; G09F 2007/1865
See application file for complete search history.

(56) References Cited

U.S. PATENT DOCUMENTS

| | | | | |
|---|---|---|---|---|
| 4,349,591 A * | 9/1982 | Kanamori | ............ | B60R 13/005 280/727 |
| 4,560,597 A * | 12/1985 | Kanamori | ............ | B60R 13/005 280/727 |
| 5,547,306 A * | 8/1996 | Zakrajsek | ................ | G09F 7/18 40/591 |
| 6,568,701 B1 * | 5/2003 | Burdack | ............ | B23K 33/004 280/728.2 |
| 7,841,641 B2 * | 11/2010 | Ohzono | .................. | B62J 17/02 296/1.08 |
| 9,656,598 B1 * | 5/2017 | Salter | ................... | B60Q 1/0011 |
| 2004/0007408 A1 * | 1/2004 | Seffernick | ............. | B60K 11/02 180/68.6 |
| 2006/0125262 A1 * | 6/2006 | Elwell | .................... | B60R 13/00 296/1.08 |
| 2007/0124972 A1 * | 6/2007 | Ratcliffe | ............... | B60R 13/005 40/591 |
| 2009/0000170 A1 * | 1/2009 | Capuzzi | ............... | B60R 13/005 40/643 |
| 2010/0300398 A1 * | 12/2010 | Weymouth, Jr. | ......... | B62J 99/00 123/198 E |
| 2011/0017560 A1 * | 1/2011 | Van Dyke | ............... | B60T 11/22 188/344 |
| 2011/0062688 A1 * | 3/2011 | Hayashi | ........... | B60R 21/21656 280/728.3 |
| 2013/0107046 A1 * | 5/2013 | Forgue | .................. | B60R 19/52 348/148 |
| 2014/0130768 A1 * | 5/2014 | Kramer | ................... | F02B 77/00 123/198 E |

(Continued)

*Primary Examiner* — Erez Gurari
(74) *Attorney, Agent, or Firm* — Underwood & Associates, LLC

(57) ABSTRACT

An adornment for a motorcycle engine is provided. The adornment includes a main body having a front surface and an opposite rear surface, the front surface including a recessed area for receiving a face plate having words, graphics or other indicia disposed thereon. The rear surface includes one or more attachment mechanisms for attaching the adornment to a selected region of the motorcycle engine. The rear surface has a contour complimentary to said selected region of said motorcycle engine.

16 Claims, 6 Drawing Sheets

(56) References Cited

U.S. PATENT DOCUMENTS

| | | | |
|---|---|---|---|
| 2015/0239390 A1* | 8/2015 | Oliverio | G07C 5/08 340/461 |
| 2015/0336517 A1* | 11/2015 | Vo | B60R 13/02 40/643 |
| 2016/0107585 A1* | 4/2016 | Sugiura | B60R 11/04 296/1.08 |
| 2016/0201874 A1* | 7/2016 | Stemmer | F21V 3/049 362/555 |
| 2017/0151903 A1* | 6/2017 | Salter | B60Q 1/22 |
| 2017/0203686 A1* | 7/2017 | Salter | F21S 43/13 |
| 2017/0259755 A1* | 9/2017 | Salter | F21K 9/64 |
| 2018/0247777 A1* | 8/2018 | Kim | H01H 13/06 |

* cited by examiner

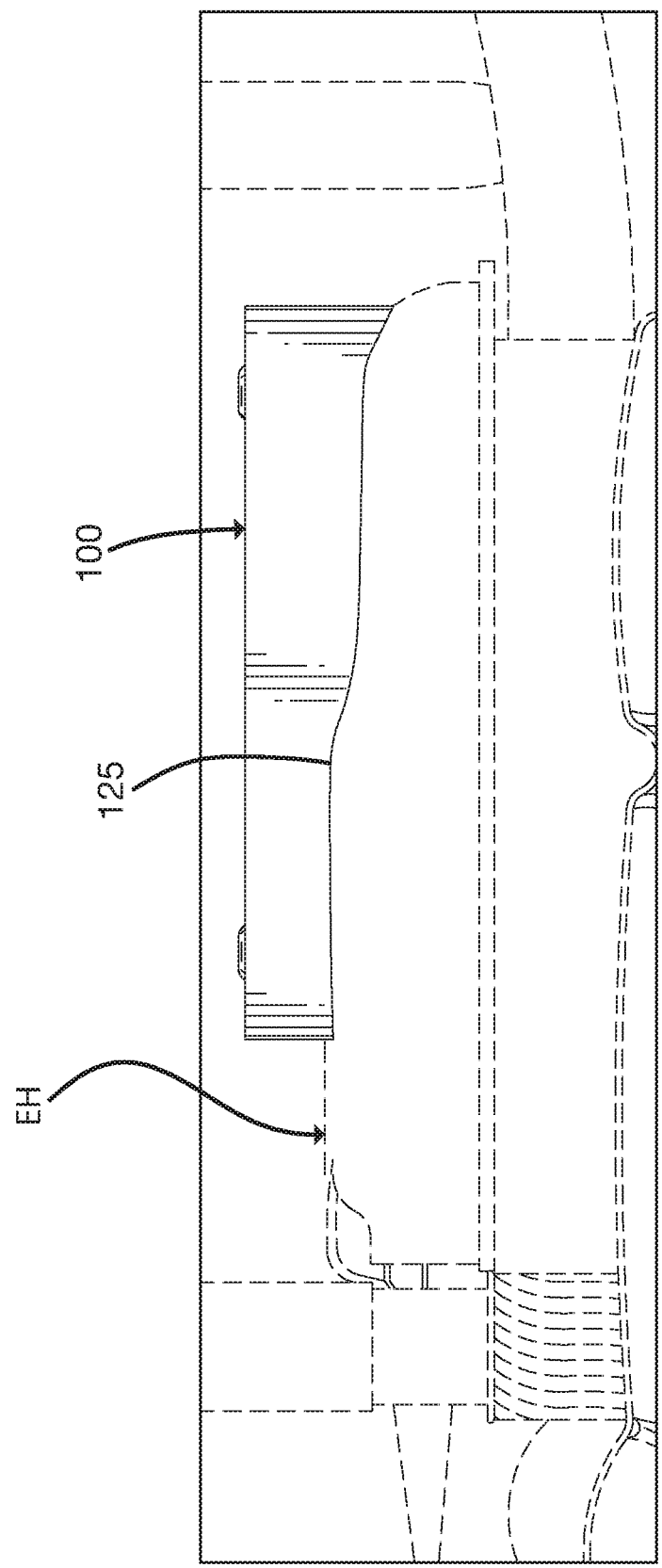

MOTORCYCLE ENGINE ADORNMENT

CROSS-REFERENCE TO RELATED APPLICATIONS

This application claims priority to, and the benefit under 35 USC § 119(e) of U.S. Provisional Patent Application No. 62/543,736 filed Aug. 10, 2017, entitled "Motorcycle Engine Adornment." The preceding patent application is incorporated by reference for all purposes as if fully disclosed herein.

TECHNICAL FIELD

This disclosure relates to adornments for motorcycle engines. In particular, this disclosure relates to adornments that can be removably engaged to at least one cooling fin of a motorcycle engine, wherein the adornment includes a contoured portion complimentary to that of the motorcycle engine.

BACKGROUND

After-market motorcycle accessories provide ways for motorcycle owners to customize their vehicles to specific tastes. While some accessories provide certain functionality or performance enhancements, other accessories can be used to create an individualistic style. Such accessories include adornments such as chrome accents, leather accoutrements, lights and other features. Certain accessories can be attached to a motorcycle with relative ease, while others may require special skill or tools.

SUMMARY

In general, a motorcycle adornment is disclosed. The adornment can be reversibly attached (e.g., attached and detached) to the head of a motorcycle engine to provide a unique, customizable aesthetic. In certain embodiments, the adornment can be securely fastened to a motorcycle head via clips that engage one or more cooling fins of the head. In certain embodiments, the adornment includes a surface contour that is complimentary to the contour of the engine head, yielding a sleek appearance that the adornment is an extension of the engine head itself.

In one exemplary embodiment, an adornment for a motorcycle engine is provided. The adornment includes a main body having a front surface and an opposite rear surface, the front surface including a recessed area for receiving a face plate having words, graphics or other indicia disposed thereon. The rear surface includes one or more attachment mechanisms for attaching the adornment to a selected region of the motorcycle engine. The rear surface has a contour complimentary to the selected region of the motorcycle engine.

In a second exemplary embodiment, an adornment for a motorcycle engine includes a main body having a front surface and an opposite rear surface, the front surface including a recessed area for receiving a face plate having words, graphics or other indicia disposed thereon, and the rear surface including at least one anchor for reversibly attaching the adornment to a selected region of the motorcycle engine. The rear surface has a contour complimentary to the selected region of the motorcycle engine.

In one embodiment, the selected region of the motorcycle engine is a cooling fin. The front surface of the adornment can be rectangular. In one embodiment, the anchor reversibly engages the selected region of the motorcycle engine through a compressive force. In one embodiment, the anchor includes at least one angled armature that engages the selected region of the motorcycle engine so as to provide a resistance to a force that disengages the adornment from the selected region.

In one embodiment, the anchor includes first and second complimentary angled armatures that engage opposite sides of the selected region of the motorcycle engine. The adornment can include two of the anchors arranged so as to engage the selected region of the motorcycle engine.

In one embodiment, the selected region of the motorcycle engine is a cooling fin; and the anchor includes first and second armatures, each of the armatures including a proximal end portion that extends perpendicularly from the rear surface and a distal end portion that is angled greater than ninety degrees back towards the rear surface. Each distal end portion of the first and second armatures can include a terminal end portion where the armature ends; and wherein a distance between the terminal end portions of the first and the second armatures is less than or equal to the outermost width of the cooling fin. For the first arm member, the minimum distance between the terminal end portion and the proximal end portion can be less than the spacing between adjacent cooling fins of the motorcycle engine. The first and second arm members can cooperatively create a compression force of the terminal end portions onto the cooling fin.

In one embodiment, the face plate is removable.

In a third exemplary aspect, a motorcycle adornment includes a main body having a front side and a back side, top, bottom, left and right sides adjacent to the front side and the back side. The left, right and front sides have rectangular exterior faces, and the front rectangular side is recessed. The back side has a contoured surface complimentary to a selected portion of a motorcycle engine. The motorcycle adornment includes least one anchor engaged to the back side that is configured to reversibly engage a portion of the selected portion of the motorcycle engine.

In one embodiment, the anchor engages the selected portion of the motorcycle engine by compression. For example, the anchor can include two opposing J-shaped armatures configured to cooperatively grip the selected portion of the motorcycle engine. Each of the J-shaped armatures can be resiliently flexible.

In one embodiment, the selected portion of the motorcycle engine is a portion of an engine cooling fin. In one embodiment, the motorcycle adornment includes two of the anchors vertically aligned with the center of the back side.

In one embodiment, the recessed portion of the front side is configured to receive a faceplate having indicia disposed thereon.

In a fourth exemplary aspect, a motorcycle adornment includes a main body having a front side and a back side, and top, bottom, left and right sides adjacent to the front side and the back side. The left, right and front sides have rectangular exterior faces, wherein the front rectangular side is recessed. The back side has a contoured surface complimentary to a selected portion of a motorcycle engine. The motorcycle adornment further includes an anchor for engaging the main body to a cooling fin of a motorcycle engine.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which:

FIG. 10 is a top plan view illustrating the motorcycle adornment of FIG. 1 engaged with the head of an exemplary motorcycle engine, according to one embodiment.

DETAILED DESCRIPTION OF ILLUSTRATIVE EMBODIMENTS

Figure 1:
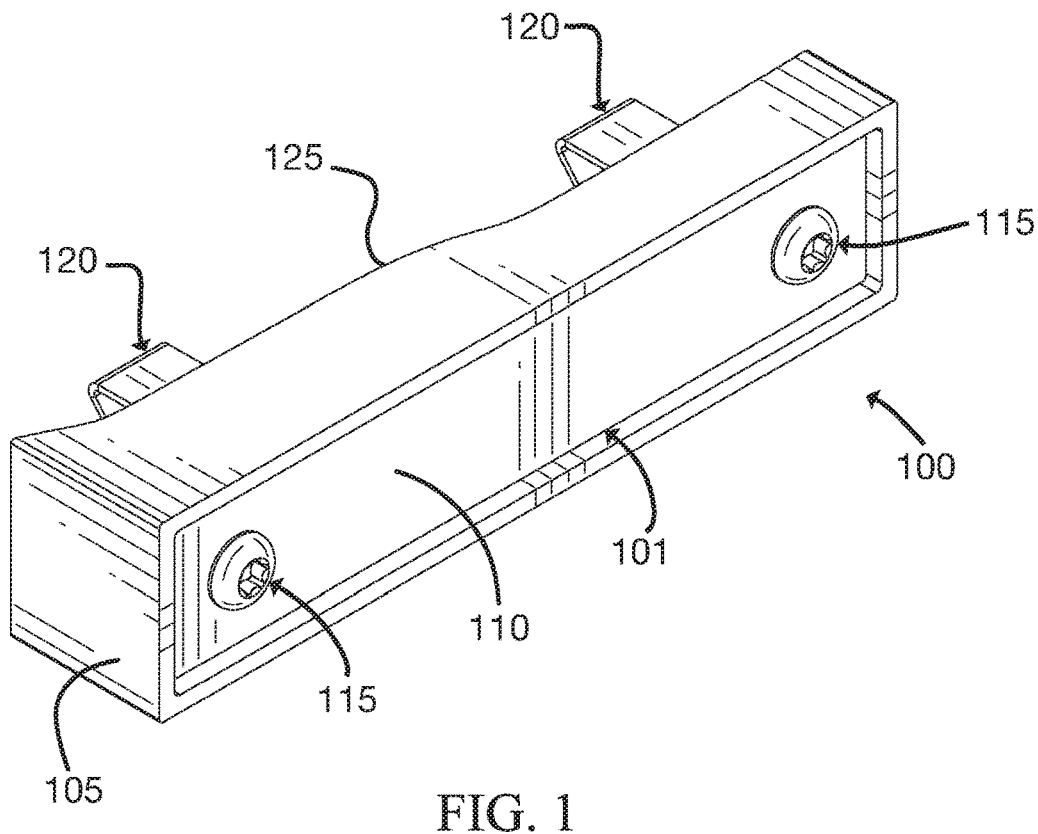
FIG. 1 is a front-side perspective view of a motorcycle adornment, according to one embodiment.
Figure 2:
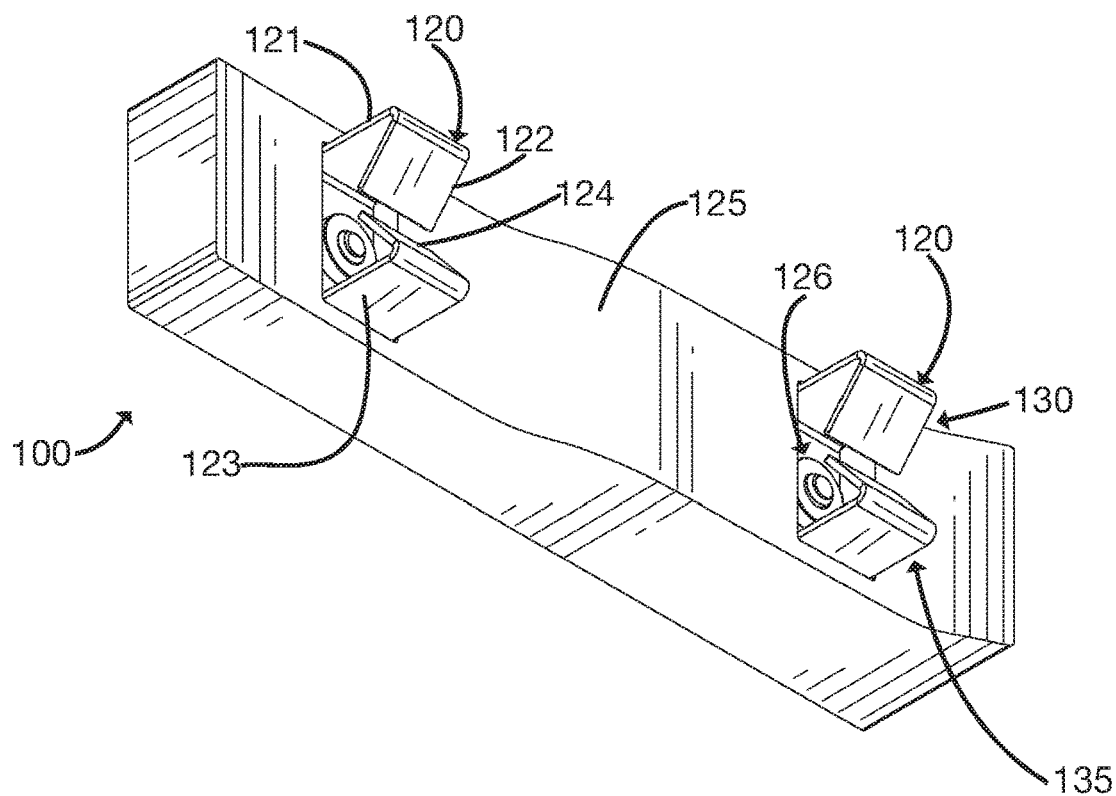
FIG. 2 is a rear-side perspective view of the motorcycle adornment shown in FIG. 1, according to one embodiment.

FIG. 1 illustrates a motorcycle adornment (hereinafter 'adornment') 100, according to one embodiment. In this embodiment, the adornment 100 includes a main body 105 that can be formed of any desired material; however, a preferred material is aluminum. The main body 105 can be polished or chrome-coated to provide a shiny appearance or, in alternative embodiments, powder-coated to provide a desired color, texture or other appearance.

Figure 3:
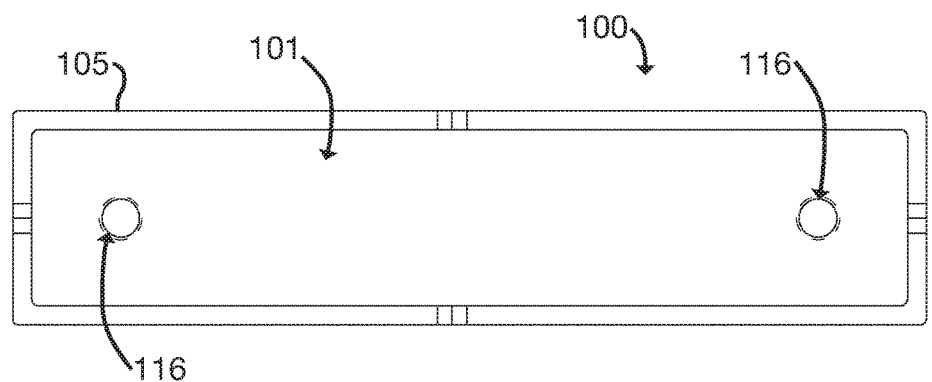
FIG. 3 is a front elevational view of the motorcycle adornment shown in FIG. 1, according to one embodiment, wherein the graphic plate has been removed to illustrate a recessed area.

In this embodiment, the front face of main body 105 includes a rectangular recessed area 101. The recessed area 101 is configured to receive a face plate 110 having a complimentary size and shape. As described in greater detail herein, face plate 110 can be used to display words, phrases, graphics or other indicia. (See, e.g., FIG. 9.) In this embodiment, face plate 110 is attached to main body 105 via bolts 115 and complimentary threaded apertures 116 (FIG. 3); however, face plate 110 can be attached to main body 105 using adhesives or other fastening devices other than, or in addition to bolts.

Referring to FIGS. 1-4 in particular, in this embodiment, adornment 100 includes an anchor 120 disposed on right and left sides of main body 105 via fasteners 126 that are configured to cooperatively provide secure, reversible engagement of the adornment 100 to a selected portion of a motorcycle engine, such as a cooling fin of the engine. In this embodiment, anchor 120 is a continuous piece formed to provide top (130) and bottom (135) armatures that are each angled to approximate a J-shape. The top J-shaped armature 130 includes top member 121 adjoining a top angled member 122; the bottom J-shaped armature 135 includes a bottom member 123 adjoining a bottom angled member 124. In particular, anchor 120 provides for engaging the main body 105 to a cooling fin of a motorcycle engine. (See, e.g., FIGS. 8 and 9.) Motorcycle engine cooling fins are known in the art and are generally used on air-cooled engines to increase the surface area that air can act on to cool the cylinder head and cylinders. Motorcycle engine cooling fins are generally thin, flat ledges protruding from the cylinder head and cylinders that are parallel to the ground.

Figure 4:
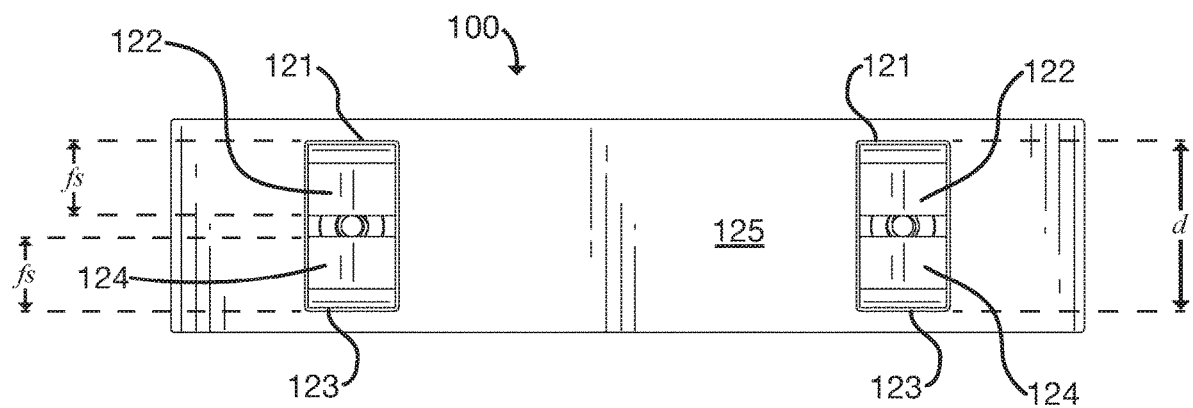
FIG. 4 is rear elevational view of the motorcycle adornment shown in FIG. 1, according to one embodiment.
Figure 8:
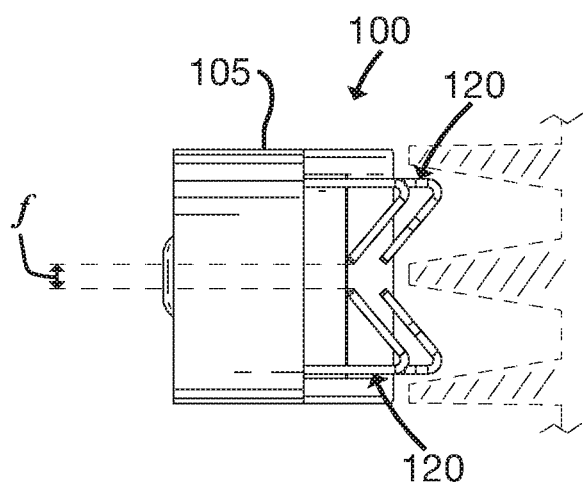
FIG. 8 is a left elevational view of the motorcycle adornment shown in FIG. 1, according to one embodiment.

Referring to FIGS. 4 and 8, in this embodiment, the top (130) and bottom (135) J-shaped armatures 130 are configured to fit within the void space between adjacent cooling fins of a motorcycle head. In particular, the distance fs between the plane of the top member 121 and the parallel plane of the terminus of the adjoining top angled member 122 as represented in FIG. 4 is slightly greater than the void space between adjacent cooling fins of a motorcycle head. (The same configuration applies to the bottom J-shaped armature 135.) Furthermore, referring momentarily to FIG. 8, the distance f between parallel planes between the termini of top and bottom angled members 122, 124, respectively is slightly less than the thickness of a cooling fin of a motorcycle head.

The above configuration of attachment mechanism 120 provides that each of the J-shaped armatures 130, 135 can be urged into the space between adjacent cooling fins of a motorcycle head. Upon doing so, the top and bottom angled members 122, 124, being resiliently flexible, provide an urging force between adjacent cooling fins that serves to retain the J-shaped armatures therein. In other words, when the J-shaped armature is inserted into the space between adjacent engine cooling fins (e.g., an upper and lower fin), the top member 121 is urged against the upper cooling fin, and the angled member 124 is urged against the bottom cooling fin.

In this embodiment, the J-shaped armatures 130, 135 are specifically configured such that the angled portion is directed outward, as illustrated, to increase friction between the angled members 122, 124 and the cooling fin, which reduces the likelihood of the adornment 100 becoming dislodged from the motorcycle head.

It should be understood that because the dimensions and configurations of engine cooling fins can vary between motorcycle manufacturers and even within different engine models by the same manufacturer, that the configuration of the adornment 100, and in particular the configuration of the attachment mechanism 120 can be adjusted accordingly.

Figure 5:
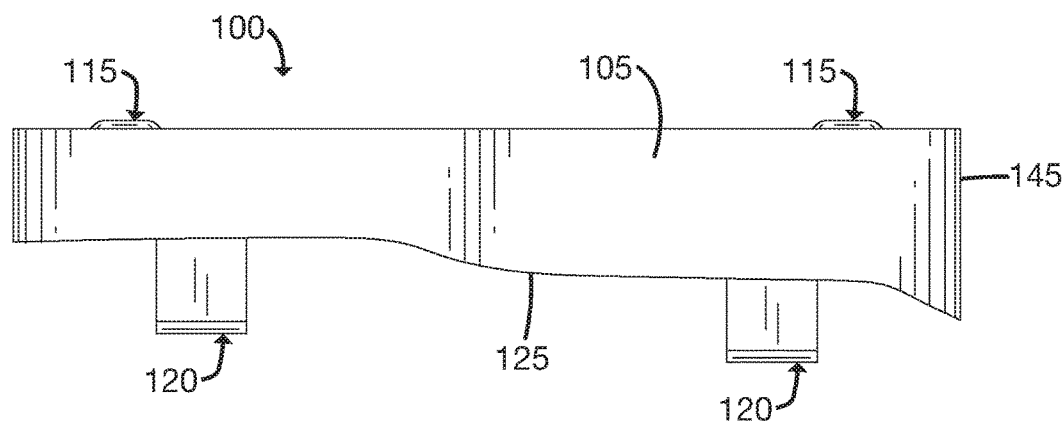
FIG. 5 is top plan view of the motorcycle adornment shown in FIG. 1, according to one embodiment.
Figure 6:
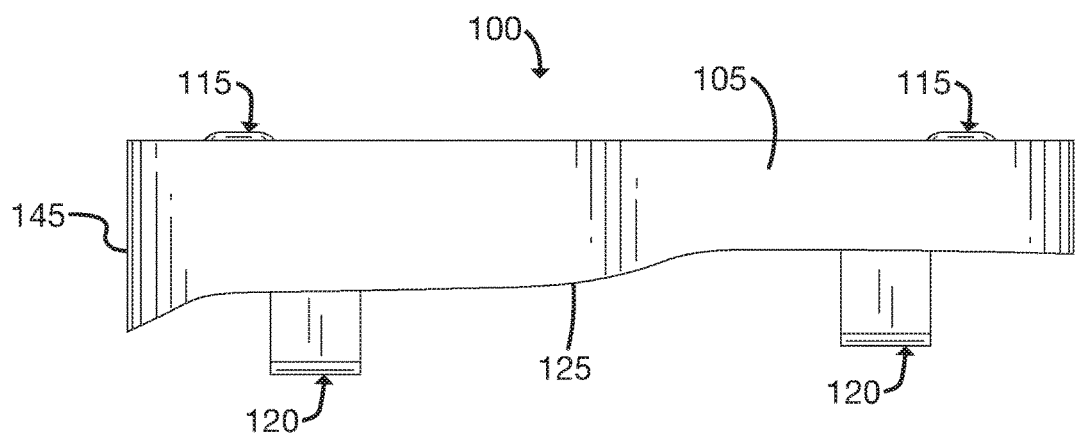
FIG. 6 is a bottom plan view of the motorcycle adornment shown in FIG. 1, according to one embodiment.
Figure 7:
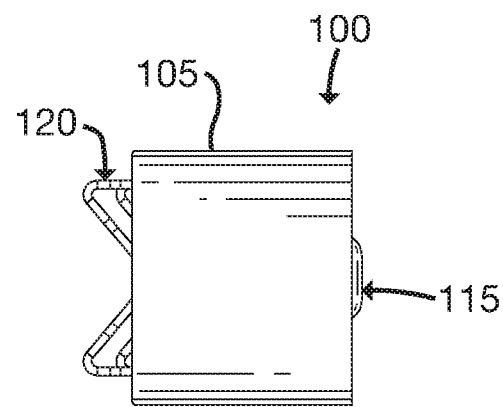
FIG. 7 is a right elevational view of the motorcycle adornment shown in FIG. 1, according to one embodiment.

Referring now to FIGS. 5 and 6, in this embodiment, adornment 100 includes a rear contoured surface 125, opposite recessed area 101. The contour of surface 125 can be made to match the contour of a selected portion of the motorcycle engine head, such that the adornment 100 appears to extend naturally therefrom. Furthermore, the contour of surface 125 can provide a configuration wherein, when the adornment 100 is placed on the engine head, the leading surface 145 of adornment 100 is arranged to be substantially perpendicular to the long axis of the motorcycle, or at any other desired angle. Similarly, when so configured, the face plate 110 can be parallel with the long axis of the motorcycle, or at any other desired angle.

Figure 9:
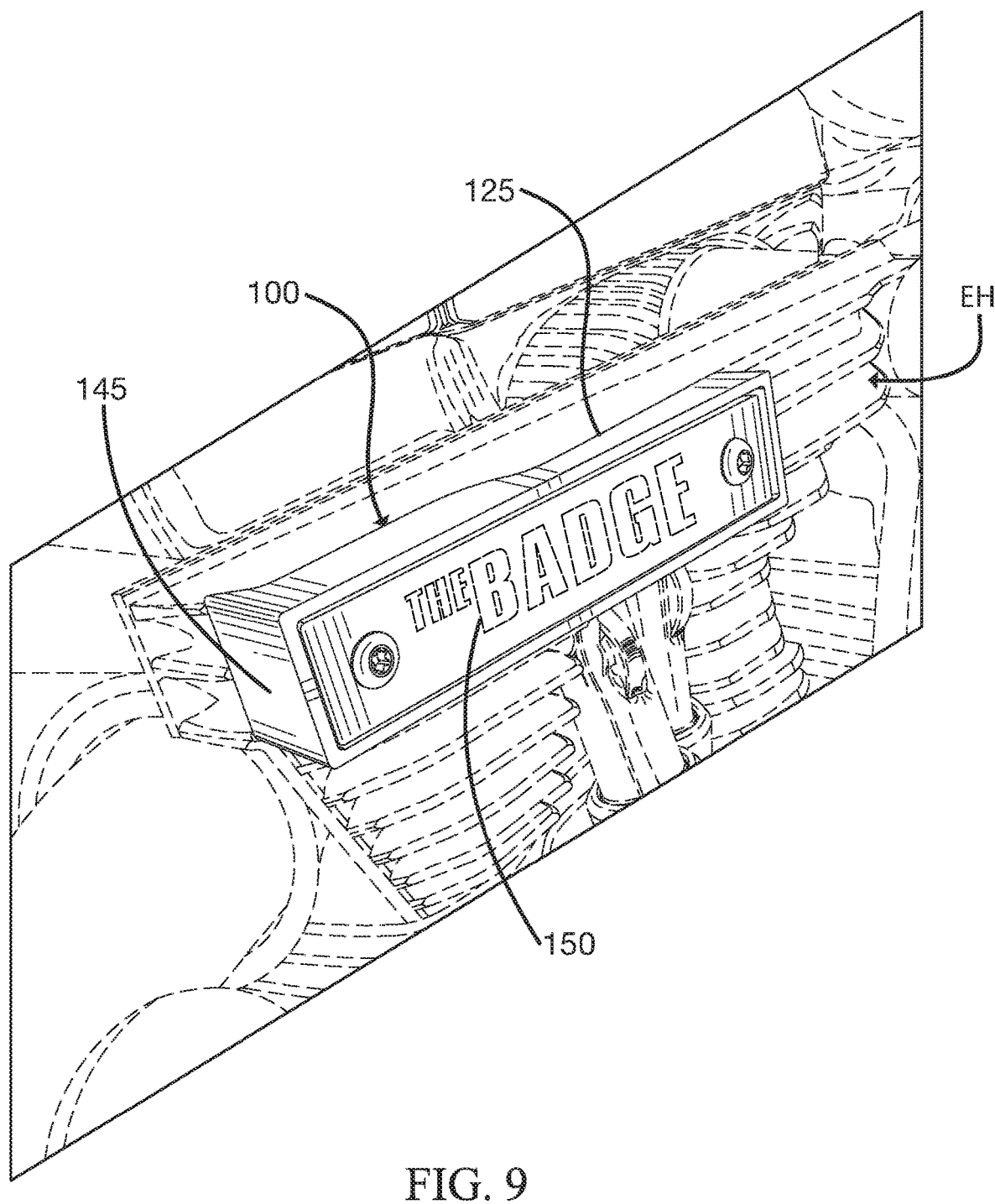
FIG. 9 is a perspective view illustrating the motorcycle adornment of FIG. 1 engaged with the head of an exemplary motorcycle engine, according to one embodiment.

For example, FIGS. 9 and 10 illustrate adornment 100 attached to a selected portion of a motorcycle engine head (EH, illustrated in dashed lines), according to one exemplary embodiment. In this example, the adornment is attached to the cooling fins of the engine head EH as described herein. The contoured rear surface 125 of the adornment matches the contour of the selected engine section such that the adornment 100 appears as an aesthetic extension thereof, and the leading surface 145 is substantially parallel with the long axis of the motorcycle. In this embodiment, face plate 110 includes the indicia "The BADGE" 150, although it should be understood that any indicia can be used.

A number of illustrative embodiments have been described. Nevertheless, it will be understood that various modifications may be made without departing from the spirit and scope of the various embodiments presented herein. For example, any number of attachment mechanisms 120 can be used, and their positions on the rear of the adornment 100 can be adjusted to engage cooling fins of a selected region of an engine head as described herein. Face plate 110 can have any desired shape, e.g., circular, square, or other shape, and recessed area 101 can have a complimentary shape. The rear contoured surface 125 of adornment 100 can be modified to fit any motorcycle or other engine. While the embodiment shown and described herein includes a recessed area to receive a face plate, wherein the face plate includes selected words, graphics or other indicia, it should be understood that in alternative embodiments, such words, graphics or other indicia can be disposed directly on the main body. In such cases, the recessed area can be optional. Accordingly, other embodiments are within the scope of the following claims.

What is claimed is:

1. An adornment for a motorcycle engine, comprising:
   a main body having a front surface and an opposite rear surface, the front surface comprising a recessed area for receiving a face plate having words, graphics or other indicia disposed thereon, and the rear surface comprising at least one anchor for reversibly attaching said adornment to a selected region of said motorcycle engine;
   wherein said rear surface has a contour complimentary to said selected region of said motorcycle engine;
   wherein said selected region of said motorcycle engine is a cooling fin; and
   wherein said anchor comprises first and second armatures, each of said armatures comprising a proximal end portion that extends perpendicularly from said rear surface and a distal end portion that is angled greater than ninety degrees back towards said rear surface.

2. The adornment of claim 1, wherein said selected region of said motorcycle engine is a cooling fin.

3. The adornment of claim 1, wherein said front surface is rectangular.

4. The adornment of claim 1, wherein said anchor reversibly engages said selected region of said motorcycle engine through a compressive force.

5. The adornment of claim 1, wherein said anchor comprises at least one angled armature that engages said selected region of said motorcycle engine so as to provide a resistance to a force that disengages said adornment from said selected region.

6. The adornment of claim 1, wherein said anchor comprises first and second complimentary angled armatures that engage opposite sides of said selected region of said motorcycle engine.

7. The adornment of claim 6, comprising two of said anchors arranged so as to engage said selected region of said motorcycle engine.

8. The adornment of claim 1, wherein each distal end portion of said first and second armatures comprises a terminal end portion where said armature ends; and wherein a distance between said terminal end portions of said first and said second armatures is less than or equal to the outermost width of said cooling fin.

9. The adornment of claim 8, wherein, for the first arm member, the minimum distance between said terminal end portion and said proximal end portion is less than the spacing between adjacent cooling fins of said motorcycle engine.

10. The adornment of claim 9, wherein said first and said second arm members cooperatively create a compression force of said terminal end portions onto said cooling fin.

11. The adornment of claim 1, wherein said face plate is removable.

12. A motorcycle adornment, comprising:
    a main body having a front side and a back side;
    top, bottom, left and right sides adjacent to the front side and the back side;
    wherein said left, right and front sides have rectangular exterior faces, said front rectangular side being recessed;
    wherein said back side has a contoured surface complimentary to a selected portion of a motorcycle engine;
    at least one anchor engaged to said back side that is configured to reversibly engage a portion of said selected portion of said motorcycle engine;
    wherein said anchor engages said selected portion of said motorcycle engine by compression; and
    wherein said anchor comprises two opposing J-shaped armatures configured to cooperatively grip said selected portion of said motorcycle engine.

13. The motorcycle adornment of claim 12, wherein each of said J-shaped armatures are resiliently flexible.

14. The motorcycle adornment of claim 12, wherein said selected portion of said motorcycle engine is a portion of an engine cooling fin.

15. The motorcycle adornment of claim 14, comprising two of said anchors vertically aligned with the center of said back side.

16. The motorcycle adornment of claim 12, wherein said recessed portion of said front side is configured to receive a faceplate having indicia disposed thereon.

* * * * *